No. 650,044. Patented May 22, 1900.
F. W. H. GRAEFF & J. F. GEISLER.
METHOD OF FILTERING SOLUTIONS AND RECOVERING ALBUMEN.
(Application filed July 12, 1898.)
(No Model.)
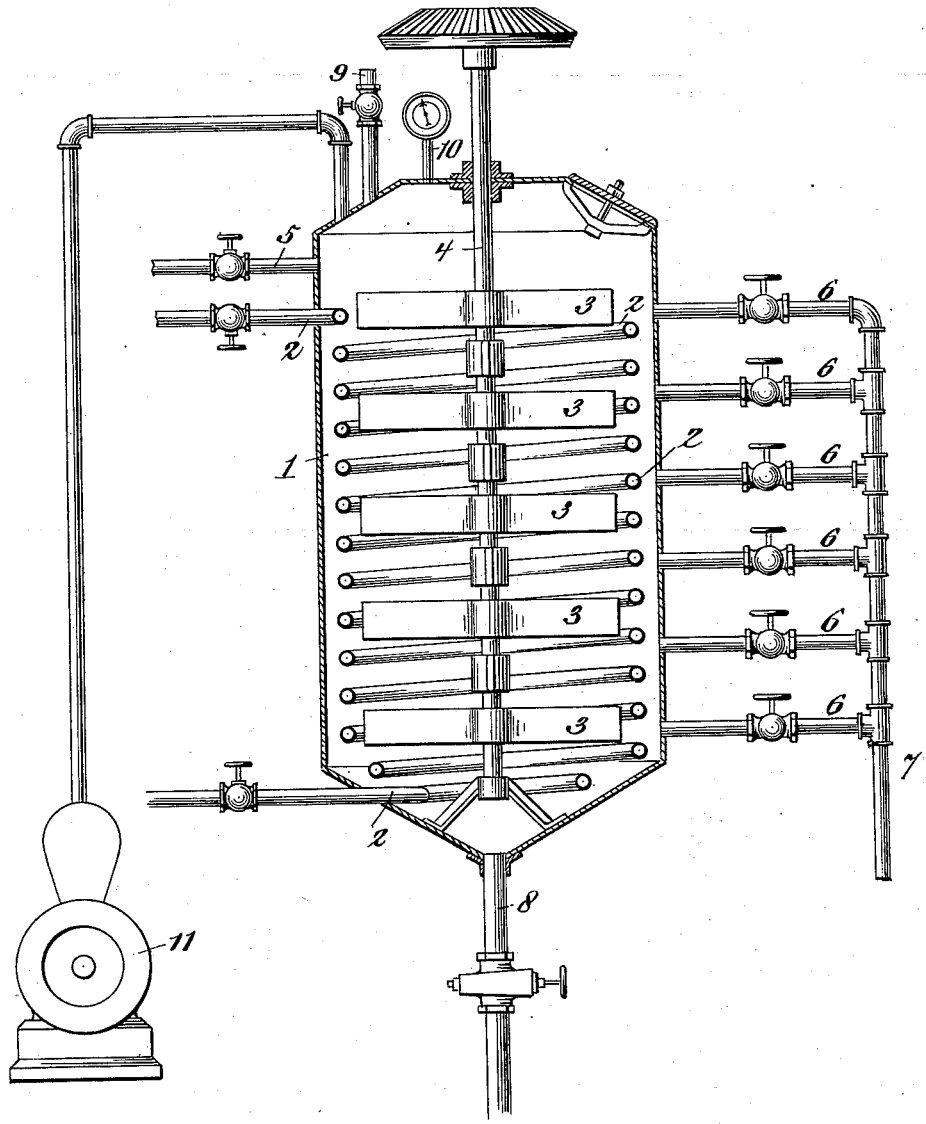
WITNESSES:
INVENTORS
ATTORNEYS

UNITED STATES PATENT OFFICE.

FRIEDRICH WILHELM HERMANN GRAEFF, OF RUTHERFORD, NEW JERSEY, AND JOSEPH F. GEISLER, OF NEW YORK, N. Y.

METHOD OF FILTERING SOLUTIONS AND RECOVERING ALBUMEN.

SPECIFICATION forming part of Letters Patent No. 650,044, dated May 22, 1900.

Application filed July 12, 1898. Serial No. 685,742. (No specimens.)

*To all whom it may concern:*

Be it known that we, FRIEDRICH WILHELM HERMANN GRAEFF, residing at Rutherford, New Jersey, and JOSEPH FRANK GEISLER, residing at 1014 Trinity avenue, New York city, State of New York, have invented certain new and useful improvements in a method for the clarification of and rendering filterable difficultly-filterable solutions, especially solutions containing albumen or albumen-like substances, or for the removal or recovery of albumen from solutions; and we do hereby declare the following to be a full, clear, and exact description of the invention, such as will enable others skilled in the art to which it appertains to make and use the same.

Our invention relates to improvements in processes for the coagulation of albumen and similar substances preparatory to their separation from fluids by filtration; and our invention consists in the novel steps of the process hereinafter described.

The objects of our invention are to coagulate albumen and similar substances more efficiently than is possible by the processes heretofore in use and in such form that their separation from fluids by filtration may be conducted readily and rapidly. These objects are attained in the process herein described, an apparatus for the carrying out of which is illustrated diagrammatically in the drawing which accompanies and forms a part of this specification.

The difficulty of clarifying fluids containing albumen and similar substances and of separating such substances from the fluids containing them by methods heretofore known is well recognized. Such clarification and separation are usually conducted by coagulating the albumenoids and similar substances by the action of heat or by the combined action of heat and pressure produced by the evaporation of the fluid in a closed vessel or by the action of chemical coagulative agents with or without the use of heat and pressure and then separating the substances so coagulated from the fluid by filtration; but it frequently happens that these methods of coagulating the albumenoids and similar substances fail to cause complete coagulation thereof or cause them to coagulate in finely-divided and slimy masses, which retard greatly the filtration or prevent it entirely, thereby necessitating repeated rehandling and transferring of the solution to the filter.

In our process the fluid to be treated (after having added to it a suitable chemical coagulative agent, if chemical coagulative agents are to be use) is passed into a suitable closed vessel, and an initial pressure of air or gas of from one to two atmospheres is applied to it therein. The fluid is then heated in a suitable manner, as by passing steam through coils of pipe within or surrounding the vessel, and as the temperature of the fluid rises the pressure within the vessel may be raised, if necessary, sufficient pressure being always maintained, so that the boiling-point of the fluid is higher than its temperature. After the fluid has been raised to the desired temperature in this manner (this temperature usually ranging from 75° to 150° centigrade) and has been held at this temperature for a time we preferably lower the pressure in the vessel rapidly by opening a suitable valve. If the fluid contains no vapors or gases which it is desired to retain therein or to save, we usually lower the pressure rapidly to atmospheric pressure; but if the fluid contains vapors or gases which it is desired to retain therein or to save the pressure is not allowed to fall so far as to cause such vapors or gases to come off. The heating under pressure without boiling while the temperature of the fluid is being raised to the desired point and the subsequent release of the pressure causes the albumenoids and similar substances to coagulate in granular masses or clots, which may be separated readily from the fluid by filtration.

Our process is particularly applicable to the clarification of and removal of albumen and similar substances from beer, wines, vinegar, liquors, fruit-juices, such as sugar-cane juices, and other saccharine and gelatinous fluids and solutions containing albumen and similar substances and to the removal of albumen from whey.

In the accompanying drawing there is illustrated, diagrammatically, an apparatus which may be employed for carrying out the process.

1 is a suitable digester or heating vessel having within it a heating-coil 2 and, preferably, stirrers 3, mounted upon a shaft 4.

5 is a pipe through which the fluid to be clarified may be admitted to the interior of the digester.

6 6 are a series of taps through which the fluid may be drawn off into a pipe 7, and 8 is a pipe through which sediment remaining in the digester may be drawn off.

9 is a blow-off pipe, 10 a pressure-gage, and 11 a pressure-pump by which air or gas pressure may be applied to the fluid within the digester.

In carrying out our process we pass the fluid into the digester 1. If the heating is to be conducted in the presence of chemical coagulative agents, these agents may be added to the fluid before it is passed into the digester. When the digester has been filled to the desired height, the valve in the admission-pipe is closed and air or gas pressure of from one to two atmospheres is applied by means of the pump 11. Steam is then passed through the heating-coils 2 until the fluid within the digester is heated to the desired temperature, usually above 100° centigrade and which may reach 150° centigrade. As the temperature of the fluid rises the pressure also rises, owing to the expansion of the air or gas; but the pressure may be increased still further by the operation of the pump, if desired, being always maintained high enough to prevent vaporization of the fluid. After the desired temperature of the fluid has been reached this temperature is maintained for a time, after which the passage of steam through the coils 2 is stopped. The contents of the digester may then be allowed to cool, the albumen and similar substances coagulating and settling to the bottom of the digester; but we find that this coagulation and settling may be hastened by relieving the pressure in the digester by opening the valve in the pipe 9. If the fluid contains no vapor or gas which it is desired to retain in the fluid or to save, the pressure may be allowed to fall at once to atmospheric pressure. Otherwise the pressure is relieved somewhat more gradually, being always kept high enough to prevent the escape of the vapors or gases which it is desired to retain. When the pressure has been relieved and the coagulated matter has been allowed to settle sufficiently, the liquid is drawn off through the tap 6, and, finally, the coagulated matter, with a certain amount of liquid, is drawn off through the pipe 8. The fluid thus drawn off is passed through suitable filters; but because by the process above described the albumenoids or similar substances coagulate in granular masses or clots the filtration may be conducted readily.

As an illustration of our process we will describe the method of clarifying raw-sugar solutions.

We first make a concentrated solution of the raw sugar in water and add thereto a solution of albumen in water in the proportion of from fifty to one hundred grams of albumen to one hundred quarts of sugar solution and stir the mixture thoroughly. The mixture is then placed in the digester, the pressure in the digester is raised to about thirty pounds per square inch by means of the compression-pump, and the contents of the digester are heated to a temperature of about 125° centigrade. During the heating the pressure in the digester rises because of the expansion of the air, and from time to time the air-pump is also operated, if necessary, until when the desired temperature is reached the pressure in the digester is about sixty pounds per square inch. This pressure and the temperature of 125° centigrade are maintained for about fifteen minutes, and then the blow-off valve is opened and the pressure allowed to fall to atmospheric pressure, the evaporation cooling the contents of the digester down to about 100° centigrade; or, if preferred, the contents of the digester may be allowed to cool slowly without opening the blow-off valve until the temperature within the digester is below the boiling temperature at atmospheric pressure and the pressure in the digester then relieved. In either case when the solution has so cooled the albumen in it has coagulated in very nearly a granular form and has clarified the solution, so that all suspended or coagulable impurities are removed with the albumen when the latter is filtered out and the albumen has coagulated in such form that filtration is easy. We have found by polarization tests that this treatment does not cause loss of sugar.

Substantially the same treatment, without the addition of albumen, may be employed for the clarification of the sugar solution obtained from sugar-cane, beets, and other sugar-producing vegetable growths in lieu of the customary heating of the solution to remove albumen prior to shipping the syrup to the refineries. In this case the solution is neutralized with lime-water before the treatment is commenced.

This process may be conducted in such manner as to effect the separation of albumen and similar substances into grades. Where this is to be done, the solution when first treated should have a decided acid reaction. After those albumens which will coagulate from the acid solution have been coagulated by the application of heat and pressure the fluid may be filtered or the coagulated albumen removed therefrom in any other suitable manner, and then the acidity of the fluid may be reduced and heat and pressure applied anew in the same manner as before. When the fluid under treatment contains a number of different albumens, it may be advisable to conduct the process by two or more successive treatments, as above described, even if the fluid be not filtered between the treatments to separate the albumenoids into grades. If it be desired, however, to coagulate the albumen in one operation, the solution should be nearly neutral before the application of heat and pressure, as above described.

With the process above described may be combined the charging or impregnating of the fluid with a suitable gas, so as to convert the fluid into an aerated, carbonated, or other gas-charged liquid. It is for this purpose particularly that the digester is provided with stirring-arms. In such case the gas by which pressure is applied to the liquid within the digester may be the gas with which the liquid is to be charged. Such gas may be caused to permeate through and combine with the liquid while the pressure is being applied, but before the heating is commenced, by operating the stirring-arms, so as to agitate the liquid.

When albumen is heated in the presence of water to a temperature equal to or exceeding about 140° centigrade under high pressure equal to or exceeding seven atmospheres, the albumen is absorbed by the water. The effect of the treatment in such cases is the exact reverse of the effect of the treatment above described for coagulating albumen. We have found that a moderate pressure of from two to four atmospheres applied from an external source and not produced by the evaporation of the fluid facilitates the coagulation of the albumen and causes it to coagulate in masses sufficiently large to permit the ready filtration of the fluid.

Ordinarily in our process the temperature will not be raised above 140° centigrade, and in no case does a harmful amount of resolution of the albumen occur.

Having thus completely described our invention, what we claim, and desire to secure by Letters Patent, is—

1. The herein-described process of clarifying fluids containing albumen and similar substances, and coagulating such substances, which consists in heating such fluids and applying pressure thereto from an external source.

2. The herein-described process of clarifying fluids containing albumen and similar substances, and coagulating such substances, which consists in heating such fluids and applying pressure thereto from an external source, the pressure applied being sufficiently high to prevent evaporation of the fluid.

3. The herein-described process of clarifying fluids containing albumen and similar substances, which consists in applying an initial pressure, derived from an external source to such fluids within a closed vessel, heating such fluids to a temperature sufficient to coagulate the albumen and similar substances, and raising the pressure progressively as the temperature of the fluid rises, so as to prevent evaporation of the fluid and to facilitate the coagulation.

4. The herein-described process of clarifying fluids containing albumen and similar substances, which consists in applying heat and pressure to the fluid, the pressure being derived from an external source, and then rapidly decreasing the pressure.

5. The herein-described process of clarifying fluids containing albumen and similar substances, which consists in heating such fluids and applying thereto pressure derived from an external source, and maintained sufficiently high to prevent evaporation of the fluid, and then suddenly decreasing the pressure.

6. The herein-described process of clarifying fluids containing albumen and similar substances, which consists in heating such fluids, in an acid condition, and applying thereto pressure derived from an external source, and maintained sufficiently high to prevent evaporation of the fluid, and then decreasing the acidity and applying heat and pressure in the same manner.

In testimony whereof we affix our signatures in presence of witnesses.

FRIEDRICH WILHELM HERMANN GRAEFF.
JOSEPH F. GEISLER.

Witnesses:
F. G. HENRY,
W. H. HEALY,
JOS. A. KARL.